(12) United States Patent
Hickey

(10) Patent No.: US 6,602,045 B2
(45) Date of Patent: Aug. 5, 2003

(54) WINGTIP WINDMILL AND METHOD OF USE

(76) Inventor: Robert Ives Hickey, St. Paul's School, Concord, NH (US) 03301

( * ) Notice: Subject to any disclaimer, the term of this patent is extended or adjusted under 35 U.S.C. 154(b) by 0 days.

(21) Appl. No.: 09/775,067

(22) Filed: Feb. 1, 2001

(65) Prior Publication Data

US 2001/0033790 A1 Oct. 25, 2001

Related U.S. Application Data

(60) Provisional application No. 60/180,500, filed on Feb. 5, 2000.

(51) Int. Cl.$^7$ ................................................. F03D 1/04
(52) U.S. Cl. ........................... 415/1; 415/4.3; 415/4.5; 415/908
(58) Field of Search .................... 415/4.3, 4.5, 908; 416/9, 4, 23; 290/44, 55

(56) References Cited

U.S. PATENT DOCUMENTS

| | | | | |
|---|---|---|---|---|
| 2,524,870 A | * | 10/1950 | Adamtchik | 416/243 |
| 3,032,119 A | * | 5/1962 | Hachmann | 416/200 R |
| 3,895,882 A | | 7/1975 | Moyer | |
| 3,920,354 A | | 11/1975 | Decker | |
| 4,045,144 A | * | 8/1977 | Loth | 415/1 |
| 4,075,500 A | * | 2/1978 | Oman et al. | 290/55 |
| 4,088,352 A | * | 5/1978 | Kling | 290/55 |
| 4,150,301 A | * | 4/1979 | Bergey, Jr. | 290/44 |
| 4,156,580 A | | 5/1979 | Pohl | |
| 4,161,370 A | | 7/1979 | Oppolzer | |
| 4,180,369 A | * | 12/1979 | Ottosen | 415/2 |
| 4,218,183 A | | 8/1980 | Dall-Winther | |
| 4,362,469 A | | 12/1982 | van Holten | |
| 4,427,343 A | * | 1/1984 | Fosdick | 416/200 A |
| 4,582,013 A | | 4/1986 | Holland | |
| 4,649,284 A | | 3/1987 | Hsech-Pen | |
| 4,832,569 A | | 5/1989 | Samuelsen | |
| 4,917,332 A | * | 4/1990 | Patterson, Jr. | 244/58 |
| 6,132,172 A | | 10/2000 | Li | |

FOREIGN PATENT DOCUMENTS

JP 61175272 A * 8/1986

OTHER PUBLICATIONS

F. B. Hildebrand, Advanced Calculus for Applications 1976, Prentice–Hall, P 456, 9.8 Ideal Fluid Flow About a Sphere.
H. Schlichting, Boundary–Layer Theory, 7th Edition 1987, McGraw Hill, P 21, Fig 1.11.
J. L. Hall, An Introduction to Vortex Breakdown and Vortex Core Bursting, National Research Council, Canada, Mar. 1985, p. 6 and p. 22, Fig 22.
B. G. Newman, The Aeronautical Quarterly, May 1959, Flow in a Viscous Trailing Vortex.
O. de Vries, Fluid Dynamic Aspects of Wind Energy Conversion, Jul. 1979, Advisory Group for Aerospace Research and Development Fig 3.17.
W. Durand, Aerodynamic Theory, A General Review of Progress, 1935, Julius Springer, vol. IV, P 326.

* cited by examiner

Primary Examiner—Ninh H. Nguyen

(57) ABSTRACT

The present invention is a system and method for enhancing the generation of power with a windmill. It comprises a horizontal axis rotating propeller with a large hub, mounted on a lift-generating device which also acts as the support structure. By adding a lift-generating device around the support structure, lower rotational speeds for the windmill propeller are possible without the penalty of excessive swirl losses in the wake. The lower design speed reduces parasitic losses and improves the overall power output of the windmill. The present invention also uses a large hub to increase the relative speed of the air over the windmill propeller near the hub, further enhancing power generation.

16 Claims, 5 Drawing Sheets

WINGTIP WINDMILL AND METHOD OF USE

RELATED APPLICATIONS

This application claims benefit of U.S. Provisional Application Serial No. 60/180500 filed Feb. 5, 2000 fully incorporated herein by reference.

BACKGROUND

1. Field of Invention

The present invention relates to the design of windmills. Such windmills are used to extract energy from the wind by mounting a propeller on a horizontal rotating shaft, and positioning it in a moving air stream. The rotating shaft is then connected either to a transmission or to a generator in order to convert the energy to a more useful form.

The energy available for wind power generation is directly proportional to the cube of the wind speed and to the square of the windmill propeller diameter. Paraphrasing the explanation found in *Aerodynamic Theory Vol. 4*, (Durand, 1935), the following terms are defined: V is the free stream velocity, u is the velocity through the area swept by the windmill propeller, a is an interference factor relating the free stream velocity to the velocity through the area swept by the windmill propeller, expressed as u=V (1−a), R is the maximum radius of the windmill propeller, and ρ is the density of air. The drag is $$D = 2\pi \rho R^2 V^2 a(1-a)$$

and the power is $$P = 2\pi \rho R^2 V^3 a(1-a)^2.$$

The efficiency of a windmill may now be expressed as the ratio of the power P to the work VD done against drag. The efficiency is simply, $$\eta = (V^*D)/P = 1-a,$$

and is maximized when a=⅓, which implies the efficiency is ⅔. Unfortunately, the available energy is reduced by friction and swirl velocity losses.

BACKGROUND

2. Description of Prior Art

The prior art consists of several configurations in which a windmill is placed in an air stream. The most commonly used method involves a propeller mounted on a rotating shaft supported by bearings mounted to a stationary (non-rotating) hub. A propeller is made up of 1 or more blades, twisted to describe a helical path, as they rotate with a hub on which they are mounted. The stationary hub is streamlined in order to minimize the disturbance to the flow and may house a generator and voltage controlling electronics. The stationary hub is mounted on a single pivot, and a conventional yaw control means is provided to point the windmill propeller in the direction of the wind. The single pivot in turn is mounted on top of a supporting structure which is high enough to insure the windmill propeller an unobstructed flow. The supporting structure is made of a steel cylinder or a steel structural-angle space frame and is mounted on a foundation. In the event the windmill is located where the wind comes predominantly from a single direction, the windmill's stationary hub would be fixed to face the propeller into the wind coming from that direction.

A disadvantage of the prior art is the high rotational design speeds of the conventional windmill propeller in relation to the free stream velocity. The speed ratio is defined as the tip speed of the windmill propeller divided by the free stream velocity. As the air passes through the area swept by the windmill propeller, it is slowed down, energy being transferred to the generator. The wake rotates in reaction to the windmill propeller torque. Analysis of the energy shows that the convected swirl is wasted. In order to reduce the convected swirl energy, high speed ratios are used which result in relatively high parasitic losses.

Several methods exist in the prior art to reduce the windmill's convected swirl energy and related energy loss. For example, a stationary propeller (stator) can be mounted either upstream or downstream of the rotating propeller. This stationary propeller will generate a counter swirl to cancel the convected swirl energy of the windmill's rotating propeller. However, this stator design involves friction losses associated with another propeller. Counter rotating designs are also found but incur added cost.

Prior art also includes vortex augmentation of the windmill wherein the propeller interacts with other aerodynamic surfaces. Referring to *Fluid Dynamic Aspects of Wind Energy Conversion*, (AGARDograph No. 243, by O. de Vries, July 1979), a delta wing was proposed to generate swirl to enhance the power generation of windmills. However, referring to *An Introduction to Vortex Breakdown and Vortex Core Bursting*, (National Research Council Canada, by J. L. Hall, 1985), a delta wing's leading edge vortex will tend to be unstable and break down into turbulence. The delta wing, therefore, is a poor vortex augmentation device.

The prior art has additional disadvantages. Conventional designs use a small hub size in order to maximize the area swept by the windmill propeller and also to avoid disturbing the flow. However, these windmill hub designs result in low relative air speeds near the hub. Since the relative speed of the air over the windmill propeller is the vector sum of the free stream velocity and the propeller's rotational velocity, the relative air speed near the hub is low compared to that near the tip. As a result, the airfoil sections of the windmill propeller near the hub are unable to extract significant energy from the flow. Some large hubs are known to exist in prior art. For example, the small windmills of less than fifteen feet in diameter used to charge batteries on sailing yachts have large hubs. These windmills have hub dimensions sized to use pre-existing "off-the-shelf" components. However, the large carefully engineered windmills have small hubs.

To summarize, typical windmills are designed for high speed ratios in order to minimize the energy lost to convected swirl velocity, which incurs relatively high parasitic losses. Typical windmills also use small hubs in order to maximize the area swept by the windmill propeller, which results in low relative air speeds near the hub and reduces the airfoil sections ability to extract energy from the air stream near the hub.

SUMMARY OF THE INVENTION

The present invention is a system and method for enhancing the generation of power with a windmill. It comprises a horizontal axis rotating propeller with a large hub, mounted on a lift-generating device which also acts as the support structure. By adding a lift-generating device around the support structure, lower rotational speeds for the windmill propeller are possible without the penalty of excessive swirl losses in the wake. The lower design speed reduces parasitic losses and improves the overall power output of the windmill. The present invention also uses a large hub to increase the relative speed of the air over the windmill propeller near the hub, further enhancing power generation. The use of a large hub also allows shorter blades to be used, which reduces blade stresses.

In the preferred embodiment, the supporting structure comprises a lift-generating device such as a wing. When placed in a flow, this lift generating device, or wing, sheds a tip vortex into the wake. The swirl generated by the wing support structure is equal and opposite to that of the windmill's rotating propeller, resulting in less total swirl convected downstream. As a result, the energy lost to swirl velocity is reduced, resulting in greater energy capture available to the windmill.

Note that a vortex shed from the tip of an efficient aircraft wing will remain substantially intact for some time. Witness the delay aircraft controllers place on small aircraft to land after a large aircraft has landed. The vortex augmentation resulting from an efficient aircraft wing is superior to delta wing vortex augmentation.

In the preferred embodiment, this wing would be much like an aircraft wing, and have a profile such as those in *The Theory of Wing Sections*, (Abbot and Doenhoff, 1959) wherein lift and drag may be determined from coefficients, and the shape of the airfoil sections determined from tables numerically describing camber and thickness. The wing support structure generates lift. Due to the three dimensional nature of the flow, a vortex is created at the tip. Swirl energy is convected downstream with the free stream flow. By designing a wing to produce swirl of equal and opposite strength to that of the windmill propeller, less total swirl is convected downstream. Further more, by reducing the design speed ratio, parasitic losses are also reduced, which increases the energy available to the system for power generation.

The aerodynamic surfaces of the wing support structure may be made from many materials. Fiberglass is particularly well suited for molding the wing in pieces, which allows for easy fabrication, transportation and assembly. The wing enclosing the support structure may be retrofitted to a pre-existing support structure.

In the event the location for the windmill has steady wind from a single direction, the wing may be fixed in place. A flap along the trailing edge of the wing is used to tune the amount of lift and consequently the amount of counter-swirl convected down stream. A leading edge flap is also applicable. In the event the location for the windmill has wind from many directions, a conventional yaw control means is needed to point the windmill propeller into the wind. An aligning means is also needed to adjust the angle of attack of the wing with respect to the wind. Lift is required to generate the tip vortex swirl energy needed to counter the windmill propeller swirl.

In the event the location is likely to experience hurricane force winds, the wing should be made with a symmetrical airfoil. This allows the wing to be aligned with the wind (feathered) in order for it to generate zero lift. In this way, the force on the supporting structure will be reduced. If the location is safe from high wind, the wing may be made with a cambered wing, which improves the chord-wise loading distribution.

Conventional wing theory teaches that an elliptical span-wise loading distribution minimizes the convected swirl energy. Here, however, the wing would be designed to generate an amount of swirl equal and opposite to that of the windmill propeller. In order to shed a more concentrated tip vortex, the span-wise circulation distribution of the wing would remain close to a constant, and not taper to zero near the tip like the elliptic loading.

Additional consideration of the lift and drag characteristics of the wing must be taken into account when the wingtip windmill is installed in a row (cascade) perpendicular to the flow or when installed in an array. The performance of a single wing is markedly different from the performance of a cascade of wings operating in close proximity and a person skilled in the art of aerodynamics will be aware of this. A single wing is designed with three dimensional airfoil theory, and will shed vorticity along its trailing edge, especially near the tip. As a result, the losses are minimized when an elliptic span-wise circulation distribution is used. On the other hand, a cascade is designed with two dimensional airfoil theory, and is characterized by the angle at which the flow leaves the trailing edge of the wings. The proximity of the adjacent wings allows higher design lift coefficients to be used without producing excessive drag. A cascade will have a nearly constant span-wise circulation distribution. The wing covered support structure is thus particularly applicable to an array of windmills.

The wing support structure may comprise a single wing, but other configurations may work as well. For example, when the supporting structure is made from a steel truss space frame, multiple wings can be incorporated into the design creating a biplane wing support structure. Additionally, when the support structure is made from a steel tube, the Magnus effect may be used, wherein a spinning coaxial cylinder replaces the wing. When a spinning cylinder is placed perpendicularly in a moving air stream, it generates lift. A vortex is shed from the tip, and swirl energy is convected downstream, just like a conventional wing. The cylinder may be rotated by a motor, by a vertical axis arrangement using anemometer cups, or by other means. This rotating cylinder is similar to the Flettner rotor used to propel ships.

In the present invention, the hub is mounted on the wing support structure in a way that resembles an airplane's wingtip fuel tank. This enhances the smooth flow of air, reduces turbulence and the associated energy loss to the system. The large hub acts as a barrier to the air flowing from the high-pressure side to the low-pressure side of the wing support structure. This enhances the formation of a coherent vortex by allowing the wing to sustain the nearly constant span-wise circulation distribution all the way to the tip.

The hub of the present invention is made large in order to increase the air speed over the propeller near the hub. Since the relative speed of the air over the windmill propeller is the vector sum of the free stream velocity plus the propeller's rotational velocity plus the disturbed component due to the large hub, the relative air speed may be increased near the hub. As a result, the airfoil sections of the windmill propeller near the large hub operate with improved efficiency when compared to the airfoil sections near a small hub.

The analytic solution for the flow field around a sphere is found in *Advanced Calculus for Engineers*, (F. B. Hildebrand, 1976). Experimental data for the flow field around a sphere is found in *Boundary Layer Theory*, (H. Schlicting, 1979). Due to friction and separation of the flow from the surface of the sphere, the full analytic velocity is not realized over the entire sphere surface and is slightly less than that predicted from theory.

The hub of the present invention may be retrofitted to an existing windmill. Either the rotating hub or the stationary hub may be made large. The propeller and rotating hub may be in front of or in back of the stationary hub.

The present system improves windmill design by providing a means to reduce convected swirl energy losses in the wake, and by providing a means to improve the propeller's ability to extract energy from the flow near the hub. Further, the windmill of the present invention provides a novel method for power generation.

REFERENCE NUMERALS IN DRAWINGS 1. large windmill hub
2. hub pivot
3. wing support structure
4. wing pivot
5. swirl adjusting flap
6. upstream flow field
7. windmill propeller
8. wake from windmill propeller
9. wake from wing-support structure
10. wingtip windmill
11. wake from wingtip windmill
12. dual wing support structure
13. cylindrical support structure
14. vertical anemometer

DESCRIPTION OF THE PREFERRED EMBODIMENT

The windmill of the present invention comprises at least one propeller with a hub, to which at least one blade is attached, having a diameter, as measured in the plane of rotation of the propeller, between 28% and 70% of the propeller diameter, a stationary hub which supports the rotating hub, a hub pivot which supports the stationary hub allowing yaw control of the propeller with respect to the wind, and a support structure having two ends, the first end of the support structure supporting the hub pivot and the second end being fixed to a foundation, typically on but not limited to the ground. In the preferred embodiment, the windmill further comprises at least one wing with an airfoil Cross section, having a span of at least one half of the propeller diameter, enclosing the support structure and at least one wing pivot which supports the wing, allowing yaw control of the wing with respect to the wind. The wing may have at least one flap to adjust the counter swirl. The wing may also comprise, but is not limited to a symmetrical airfoil for high wind situations and a cambered airfoil for situations without high winds.

Figure 1:
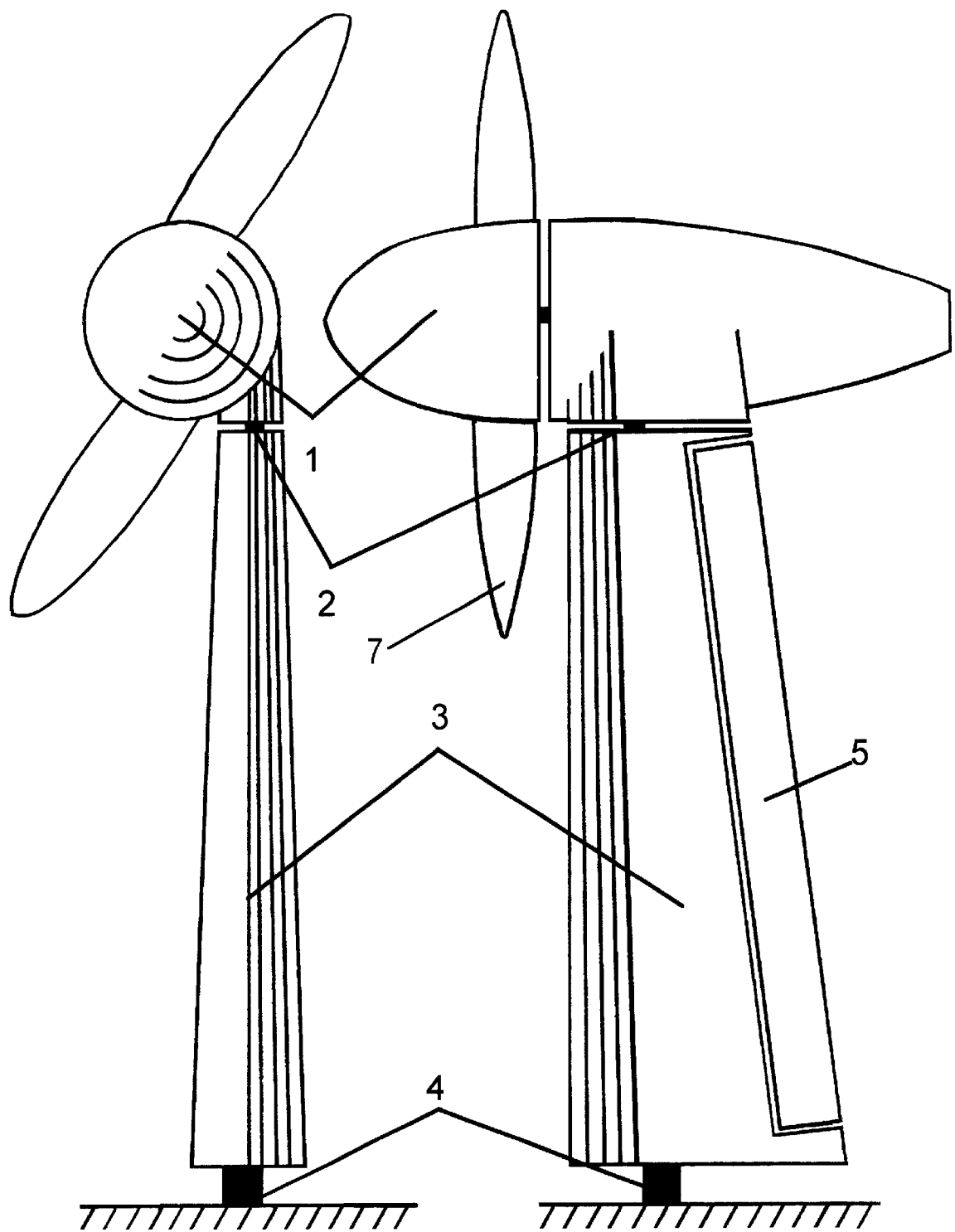
FIG. 1 depicts the front and side views of the wingtip windmill.

Referring to FIG. 1, the windmill includes a large hub 1, with hub pivot 2, all mounted Non a wing-support structure 3, with a wing pivot 4 to align the wing with the wind, and with a swirl adjusting flap 5. In the preferred embodiment, the windmill has at least one propeller 7 of greater than 15 feet in diameter is attached to the rotating hub.

Figure 2:
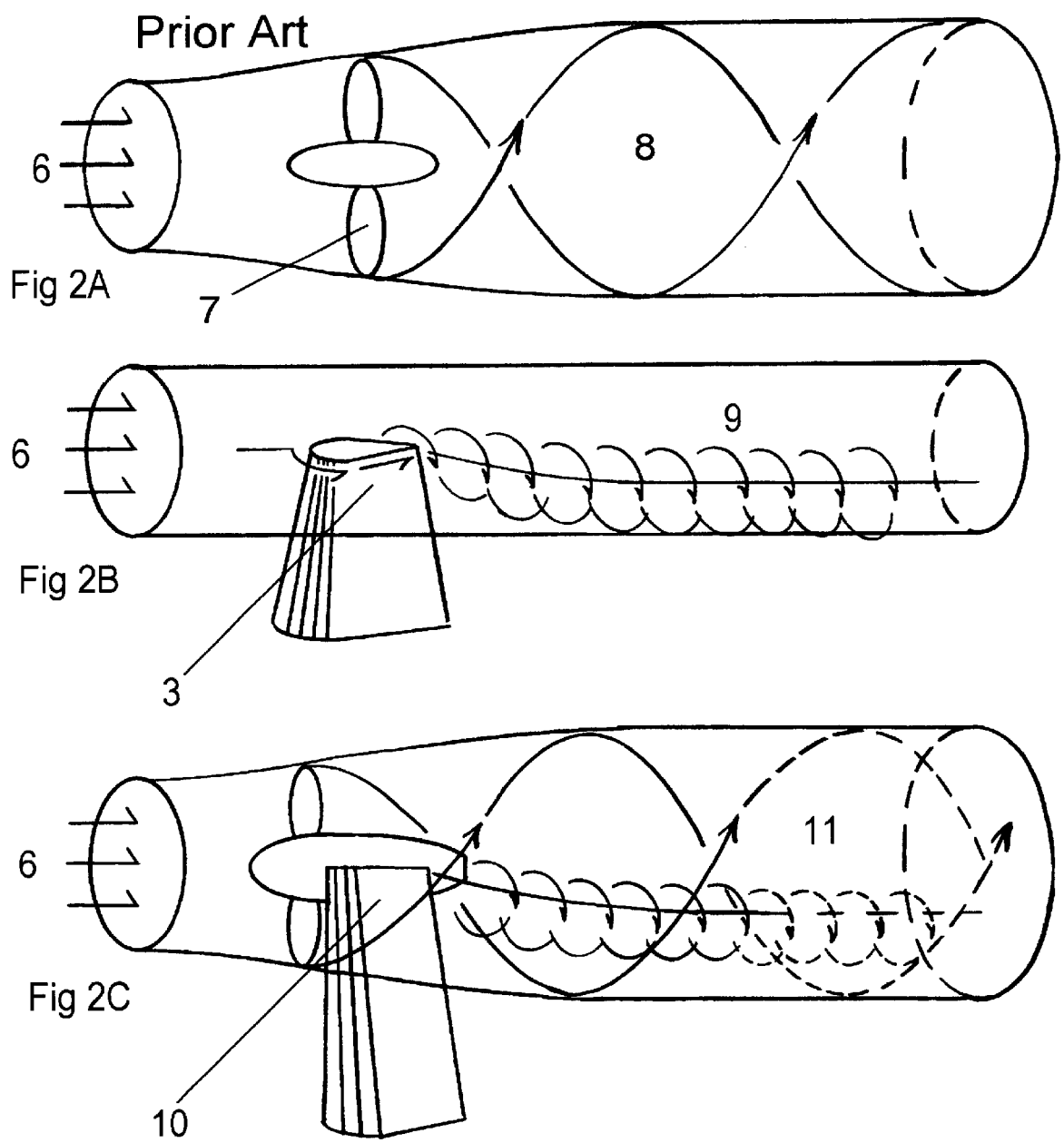
FIG. 2A is a depiction of the airflow through a windmill propeller.
FIG. 2B is the depiction of the airflow over a wingtip.
FIG. 2C is a depiction of a vortex from the lift generating support structure which mixes with the swirling wake of the windmill's propeller when using the wingtip windmill.

FIGS. 2A, 2B, and 2C illustrate the operation of the invention. FIG. 2A represents prior art, in which the upstream flow field 6 passes over the windmill's propeller 7, and enters the wake region 8. Some of the flow field energy is transferred to the windmill propeller 7, and as a result, the upstream flow field 6 slows down and expands in the windmill propeller wake 8. Additionally, the windmill propeller wake 8 rotates in reaction to the torque of the windmill propeller 7. In FIG. 2B, the upstream flow field 6 approaches the wing support structure 3 of the present invention, and sheds a swirling wake 9, of equal and opposite strength to the windmill's propeller wake 8.

The present invention combines the windmill propeller's wake 8 with the wing support structure's wake 9. In figure 2C, upstream flow field 6 approaches the wingtip windmill design 10, and passes into the wingtip windmill wake 11. The addition of the wing support structure's wake 9 to the windmill propeller wake 8 results in mixing in the wingtip windmill's wake 11. Because the wing support structure's wake 9 is designed to be of equal and opposite strength to that of the windmill propeller's wake 8, the total amount of swirl energy remaining in the wingtip windmill's wake 11 after mixing is greatly reduced, when compared to the windmill propeller's wake 8 operating alone. This improves the efficiency of the wingtip windmill 10 because less total swirl is convected downstream in the wingtip windmill's wake 11.

In the preferred embodiment, the large hub comprises between twenty-eight to seventy percent of the diameter of the windmill propeller as measured in the plane of the windmill propeller. This range of numbers was determined from a trade-off study, in which the kinetic energy of the disturbed air over the large hub was compared for various hub ratios using a constant propeller diameter. The area swept by the windmill propeller is a function of diameter squared. The kinetic energy of air passing through the windmill propeller is a function of air speed cubed and diameter squared. The trade-off is increased kinetic energy versus decreased area. If you assume, as in prior art, that the flow field passing through a windmills propeller is substantially undisturbed, then the energy passing through the windmill propeller is maximized when the annular area swept by the windmill propeller is also maximized. This strongly suggests that the diameter of the windmills hub should be made as small as possible. However, when the cubic nature of the kinetic energy of the disturbed air around the hub is considered, a hub with the specific dimension of 45 percent of the windmill propeller diameter results, despite reducing the area swept by the windmill propeller. Thus, the windmill of the present invention further comprises a rotating hub with a diameter, as measured in the plane of rotation of the propeller, of 45% of said propeller.

While FIG. 1 and FIG. 2C illustrate wingtip windmills designed specifically for the wing-support structure, pre-existing support structures may be retrofitted with a wing enclosing the support structure. Large hubs may be retrofitted to improve windmill operation as well. For example, a rotating hub, having a diameter, as measured in the plane of rotation of the propeller, between 28% and 70% of said propeller diameter, may be retrofitted to a pre-existing windmill.

Figure 3:
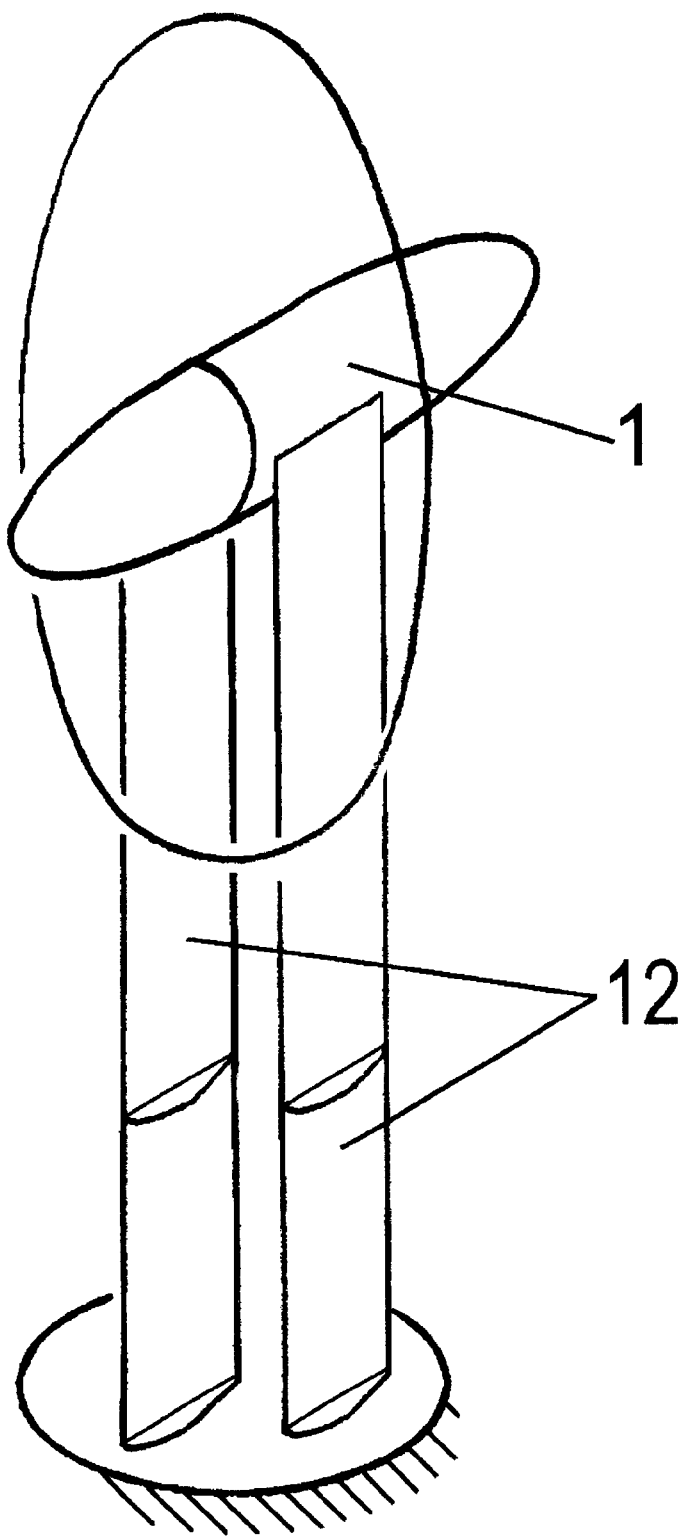
FIG. 3 is a perspective view of an additional embodiment of the invention, wherein a dual wing arrangement replaces the single wing.

FIG. 3 illustrates another embodiment of the present invention, a windmill comprising at least one propeller, having a hub, to which at least one blade is attached, with a diameter, as measured in the plane of rotation of the propeller, between 28% and 70% of the propeller diameter, a stationary hub which supports the rotating hub, a hub pivot which supports the stationary hub allowing yaw control of the propeller with respect to the wind, a support structure having two ends, the first end of the support structure supporting the hub pivot and the second end being fixed to a foundation, a dual wing having a span of at least one half of the propeller diameter, enclosing the support structure, and a dual wing pivot which supports the dual wing, allowing yaw control of the dual wing with respect to the wind.

The large windmill hub 1 is supported by a dual wing support structure 12. A dual-wing support structure 12, may be incorporated into an existing steel space frame and achieve similar results as a single wing support structure. Pre-existing support structures may be retrofitted with a dual wing enclosing the support structure.

Figure 4:
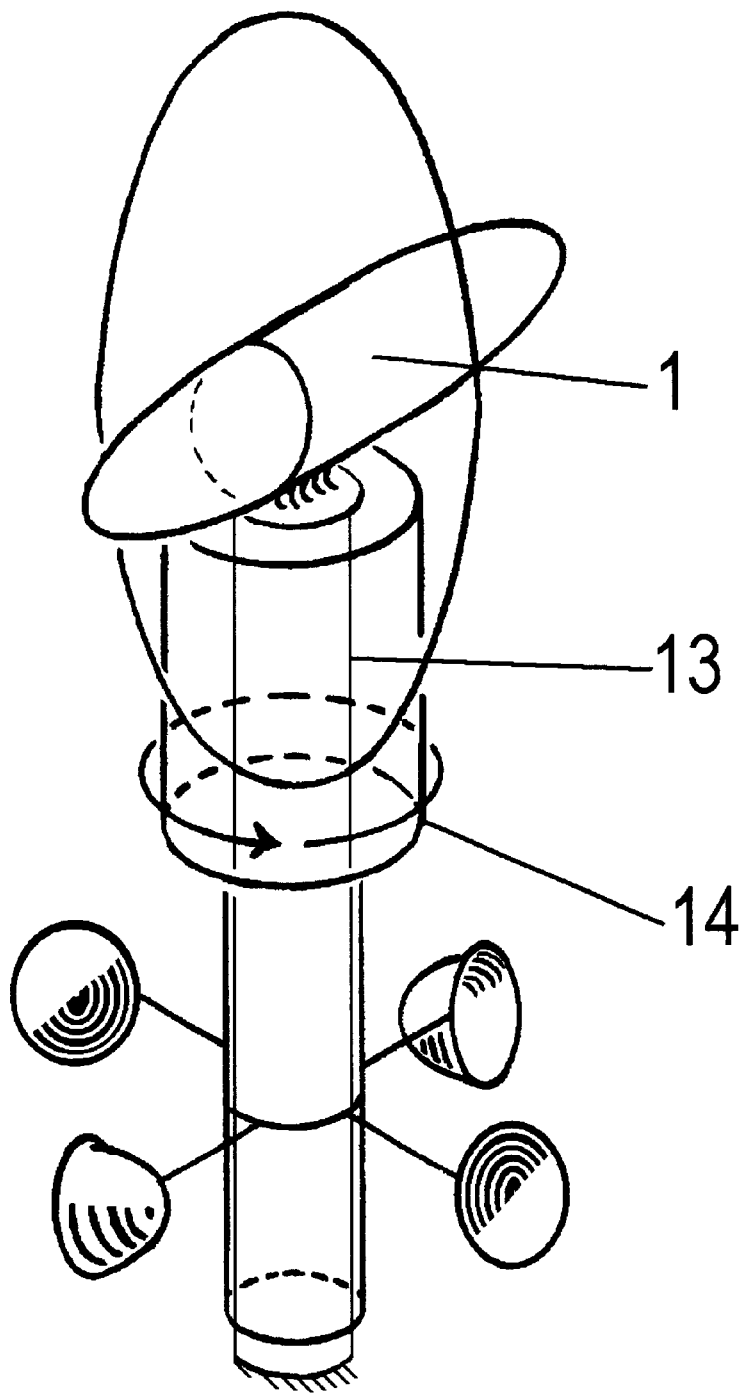
FIG. 4 is a perspective view of another embodiment of the present invention, using the Magnus effect, wherein a rotating coaxial cylinder replaces the single wing.
Figure 5:
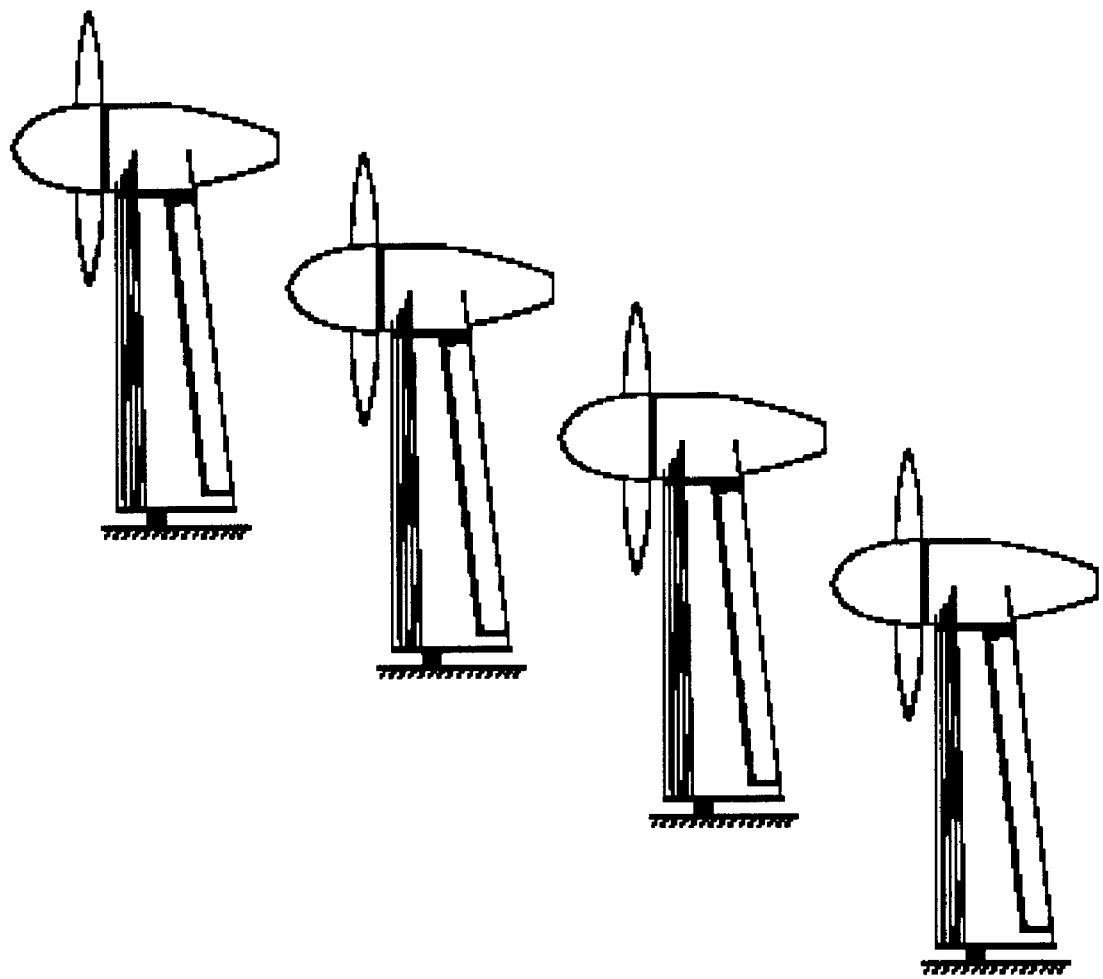
FIG. 5 is a view of multiple windmills of the present invention arranged in a row.

FIG. 4 illustrates yet another embodiment of the present invention, a wingtip windmill with a support structure incorporating a coaxial-rotating cylinder on the outside, using the Magnus effect to generate lift. The windmill of this embodiment comprises at least one propeller, having a hub, to which at least one propeller is attached, with a diameter, as measured in the plane of rotation of the propeller, between 28% and 70% of the propeller diameter, a stationary hub which supports the rotating hub, a hub pivot which supports the stationary hub allowing yaw control of the propeller with respect to the wind, a support structure having two ends, the first end of the support structure supporting the hub pivot and the second end being fixed to a foundation, and a coaxial rotating cylinder having a span of at least one half of the propeller diameter, enclosing the support structure.

The large windmill hub 1 is supported by a cylindrical support structure 13. Supporting structures are usually steel truss space frames or steel cylinders. A coaxial rotating cylinder in the form of a vertical-axis anemometer 14, may be placed around the support structure and achieve similar results as the single wing. This coaxial-rotating cylinder may also be powered by a motor or other means.

The windmill of the present invention may be used singly or may be grouped in arrays. Grouped windmills may be positioned so as to maximize flow. For example, the windmills may be arranged in a row substantially perpendicular to the flow.

The present invention also includes a method for generating electricity comprising the step of turning a generator using a windmill comprising at least one propeller, having a hub, to which the at least one blade is attached, with a diameter, as measured in the plane of rotation of the propeller, between 28% and 70% of the propeller diameter, a stationary hub which supports the rotating hub, a hub pivot which supports the stationary hub, allowing yaw control of the propeller with respect to the wind, a support structure having two ends, the first end of the support structure supporting the hub pivot and the second end being fixed to a foundation, at least one wing with an airfoil cross section, having a span of at least one half of the propeller diameter, enclosing said support structure, and at least one wing pivot which supports the wing, allowing yaw control of the wing with respect to the wind. The method may include the additional step of arranging said windmill in an array.

The windmill of the present invention may also be located offshore wherein the foundation of the supporting structure is a moored barge. Furthermore, since the engineering principles applicable to air are also applicable to water or other fluid, a suitably designed wingtip windmill could be submerged in an ocean current and generate electricity.

While I have illustrated and described several embodiments of my invention herein, it will be understood that these are by way of illustration only and that various changes and modifications may be contemplated in my invention and are within the scope of the following claims.

I claim:

1. A windmill comprising:
    at least one propeller, having a diameter and a wake, wherein said propeller comprises
    a rotating hub, to which at least one blade is attached,
        wherein said rotating hub comprises a diameter, as measured in the plane of rotation of
        the propeller, between 28% and 70% of said propeller diameter;
    a stationary hub which supports said rotating hub;
    a hub pivot which supports said stationary hub, allowing yaw control of
    said propeller with respect to the wind;
    at least one support structure having two ends, the first end of said at least one support structure supporting said hub pivot;
    the second end
    being fixed to a foundation;
    at least one wing with an airfoil cross section, having a span of at least one half of said propeller diameter, enclosing said at least one support structure;
    at least one wing pivot which supports said wing, allowing yaw control of said wing with respect to the wind; and
    wherein said at least one wing with an airfoil cross section sheds a tip vortex into said wake of said propeller.

2. The windmill of claim 1, further comprising a wing with at least one flap to adjust the counter swirl.

3. The windmill of claim 1, wherein said at least one wing is a symmetrical airfoil.

4. The windmill of claim 1, wherein said at least one wing is a cambered airfoil.

5. The windmill of claim 1, wherein said at least one wing enclosing the support structure is retrofitted to a pre-existing support structure.

6. The windmill of claim 1, wherein said windmill is arranged substantially perpendicular to the flow in a row of windmills.

7. The windmill of claim 1, wherein said propeller is greater than 15 feet in diameter.

8. The windmill of claim 1, further comprising a rotating hub with a diameter, as measured in the plane of rotation of the propeller, of 45% of said propeller diameter.

9. A windmill comprising:
    at least one propeller, having a diameter, wherein said propeller comprises
    a rotating hub, to which at least one blade is attached,
        wherein said rotating hub comprises a diameter, as measured in the plane of rotation of
        the propeller, between 28% and 70% of said propeller diameter;
    a stationary hub which supports said rotating hub;
    a hub pivot which supports said stationary hub allowing yaw control of said propeller with respect
    to the wind;
    a support structure having two ends, the first end of said support structure supporting said hub pivot;

the second end being fixed to a foundation; and
a coaxial rotating cylinder having a span of at least one half of said propeller diameter, enclosing said at least one support structure.

10. The windmill of claim 9, wherein said propeller is greater than 15 feet in diameter.

11. The windmill of claim 9, further comprising a rotating hub with a diameter,
as measured in the plane of rotation of the propeller, of 45% of said propeller diameter.

12. The windmill of claim 9, wherein said at least one wing enclosing the support structure is retrofitted to a pre-existing support structure.

13. A windmill comprising:
at least one propeller, having a diameter and a wake, wherein said propeller diameter is greater than 15 feet in diameter, wherein said propeller comprises
a rotating hub, to which at least one blade is attached, having a diameter, as measured in the plane of rotation of the propeller, of 45% of said propeller diameter;
a stationary hub which supports said rotating hub;
a hub pivot which supports said stationary hub, allowing yaw control of said propeller with respect to the wind;
at least one support structure having two ends, the first end of said at least one support structure supporting said hub pivot; the second end being fixed to a foundation;
at least one wing with an airfoil cross section, having a span of at least one
half of said propeller diameter, enclosing said at least one support structure;
at least one wing pivot which supports said wing, allowing yaw control of said wing with respect to the wind; and
wherein said at least one wing with an airfoil cross section sheds a tip vortex into said wake of said propeller.

14. A method for generating electricity comprising the step of:
turning a generator using a windmill comprising
at least one propeller, having a diameter and a wake, wherein said propeller comprises
a rotating hub, to which at least one blade is attached,
wherein said rotating hub comprises a diameter, as measured in the plane of
rotation of the propeller, between 28% and 70% of said propeller diameter;
a stationary hub which supports said rotating hub;
a hub pivot which supports said stationary hub, allowing yaw control of said propeller with respect to the wind;
at least one support structure having two ends, the first end of said at least one support structure supporting said hub pivot;
the second end being fixed to a foundation;
at least one wing with an airfoil cross section, having a span of at least one half of said propeller diameter, enclosing said at least one support structure;
at least one wing pivot which supports said wing, allowing yaw control of said wing with respect to the wind; and
wherein said at least one wing with an airfoil cross section sheds a tip vortex into said wake of said propeller.

15. The method of claim 14 further comprising the step of:
arranging said windmill in an array.

16. A method for generating electricity comprising the step of:
turning a generator using a windmill comprising
at least one propeller, having a diameter, wherein said propeller comprises
a rotating hub, to which at least one blade is attached,
wherein said rotating hub comprises a diameter, as measured in the plane of rotation of
the propeller, between 28% and 70% of said propeller diameter;
a stationary hub which supports said rotating hub;
a hub pivot which supports said stationary hub, allowing yaw control of said propeller with respect to the wind;
at least one support structure having two ends, the first end of said at least one support structure supporting said hub pivot;
the second end being fixed to a foundation;
a coaxial rotating cylinder having a span of at least one half of said propeller diameter, enclosing said at least one support structure.

* * * * *